(12) United States Patent
Cole et al.

(10) Patent No.: US 11,413,697 B2
(45) Date of Patent: Aug. 16, 2022

(54) WIRE MANAGEMENT FOR A WELDING SYSTEM

(71) Applicant: LINCOLN GLOBAL, INC., Santa Fe Springs, CA (US)

(72) Inventors: Stephen R. Cole, Chula Vista, CA (US); Richard Dean Traver, San Diego, CA (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 354 days.

(21) Appl. No.: 16/583,393

(22) Filed: Sep. 26, 2019

(65) Prior Publication Data

US 2020/0139467 A1 May 7, 2020

Related U.S. Application Data

(60) Provisional application No. 62/754,621, filed on Nov. 2, 2018.

(51) Int. Cl.
| | |
|---|---|
| *B23K 9/028* | (2006.01) |
| *B23K 9/12* | (2006.01) |
| *B23K 9/26* | (2006.01) |
| *B23K 9/28* | (2006.01) |

(52) U.S. Cl.
CPC ............ *B23K 9/0286* (2013.01); *B23K 9/121* (2013.01); *B23K 9/124* (2013.01); *B23K 9/26* (2013.01); *B23K 9/282* (2013.01)

(58) Field of Classification Search
CPC .......... B23K 9/121; B23K 9/124; B23K 9/26; B23K 9/282; B23K 9/133
See application file for complete search history.

(56) References Cited

U.S. PATENT DOCUMENTS

| | | | | |
|---|---|---|---|---|
| 3,748,426 | A | * | 7/1973 | Stanley ............... B23K 9/0286 219/60 A |
| 4,649,250 | A | | 3/1987 | Kazlauskas |
| 6,066,833 | A | | 5/2000 | Rigdon et al. |
| 6,479,795 | B1 | | 11/2002 | Albrecht et al. |
| 9,102,000 | B2 | | 8/2015 | Matiash et al. |
| 2007/0023479 | A1 | * | 2/2007 | Koppert ............... B23K 9/0286 228/101 |
| 2008/0156783 | A1 | | 7/2008 | Vanden Heuvel et al. |
| 2010/0051586 | A1 | | 3/2010 | Guerrina et al. |

(Continued)

FOREIGN PATENT DOCUMENTS

| | | |
|---|---|---|
| CN | 104096948 A | 10/2014 |
| CN | 207139094 | 3/2018 |

(Continued)

OTHER PUBLICATIONS

Helix C450 Orbital Weld Head; Orbital Systems; 1999-2019 Lincoln Electric Company; 3 Pages.

(Continued)

*Primary Examiner* — Brian W Jennison
(74) *Attorney, Agent, or Firm* — Tucker Ellis LLP (57) ABSTRACT

A welding system can manage wire feeders such that unused wire feeders are conveniently stowed. The welding system include two or more wire feeders individually attachable to a welding torch. The welding system includes one or more mount points to secure unused wire feeders and enable convenient swapping of an active wire feeder.

20 Claims, 8 Drawing Sheets

(56) References Cited

U.S. PATENT DOCUMENTS

| | | | |
|---|---|---|---|
| 2015/0129581 A1* | 5/2015 | Cole .................... | B23K 9/0286 |
| | | | 219/60 A |
| 2015/0246407 A1* | 9/2015 | Gelmetti ................ | B23K 9/125 |
| | | | 219/137.71 |
| 2017/0072495 A1 | 3/2017 | Cole et al. | |

FOREIGN PATENT DOCUMENTS

| | | |
|---|---|---|
| DE | 10 2015 003083 A1 | 9/2016 |
| GB | 1354395 | 6/1974 |
| JP | H09-267170 A | 10/1997 |

OTHER PUBLICATIONS

Apex 2100 Orbital Welding System; Orbital Welding Solutions; Copyright Lincoln Global, Inc.; Apr. 2017; 16 pgs.
Kemppi FastMig X 450-MXP 37 Pipe; 12 pgs. info@au@kemppi.com; Dec. 2019.
Miller D-74 MPa Plus Dual Wire Feeder 951292; https://store.cyberweld.com/miller-d-74-mpa-plus-wire-feeder-951292.html; Dec. 2019; 5 pgs.
Miller PipeWorx Welding System; https://www.millerwelds.com/equipment/welders/multiprocess/pipeworx-welding-system-m00326; Dec. 2019; 12 pgs.
Extended European Search Report from Corresponding European Application No. 19206968.0; dated Apr. 16, 2020; pp. 1-7.

* cited by examiner

WIRE MANAGEMENT FOR A WELDING SYSTEM

CROSS-REFERENCE TO RELATED APPLICATIONS

This application claims priority to U.S. Provisional Patent Application Ser. No. 62/754,621, entitled WIRE MANAGEMENT FOR A WELDING SYSTEM, filed Nov. 2, 2018; which is incorporated herein by reference in its entirety.

TECHNICAL FIELD

In general, the present invention relates to arc welding and, in particular, to techniques for managing unused wire feeders.

BACKGROUND OF THE INVENTION

In industrial applications, welding may involve, raising, cladding, building up, filling, hard overlaying, joining, and other welding applications. When confronted with a workpiece having a curved surface, an orbital welding process may be used to rotate a welding head to apply a weld to the curved surface. A common example, where orbital welding is used, is pipe welding. Pipe welding may include thin wall applications where the welding head is rotated about the outer surfaces of two pieces having ends being joined together. Alternatively, pipe welding may include deep grove geometries where an electrode extends into a grove between the two pieces being joined to lay down successive beads of weld material to fill the grove and join the pipes. Orbital welding systems may include a welding head that is mounted on a guide track or a fixture that damps or is otherwise supported on a workpiece. The welding head follows the guide track to create a weld.

SUMMARY OF THE INVENTION

The following summary presents a simplified summary in order to provide a basic understanding of some aspects of the (devices, systems and/or methods) discussed herein. This summary is not an extensive overview of the (devices, systems and/or methods) discussed herein. It is not intended to identify critical elements or to delineate the scope of such (devices, systems and/or methods). Its sole purpose is to present some concepts in a simplified form as a prelude to the more detailed description that is presented later.

In various embodiments, a welding system includes at least two wire feeders utilized in a welding operation. Each wire feeder includes an associated wire liner that provides a conduit for fed welding wire and is terminated with a connector to facilitate attachment to other components of the welding system. In one aspect, the wire feeders may be coupled to a welding torch for MIG welding, for example. The wire feeders may be attached to the welding torch one at a time. Accordingly, the welding system is configured to provide a stowage position for a wire liner associated with an unused wire feeder. The stowage position secures the unused wire feeder to ensure the wire feeder does not interfere with the operation of the welding system while maintaining access for convenient swapping of wire.

In accordance with one aspect, a welding system is provided that includes a welder unit coupled to at least one of a guide track or a mobile chassis. The system further includes a weld head unit operatively coupled to the welder unit. The weld head unit supports a welding torch. The welding system also includes at least two wire feeders mounted on the welder unit. Each wire feeder includes a respective wire liner terminated with a respective connector. In addition, the welding system includes at least one mount adapted to attach to at least one wire feeder via the respective connector. An active wire feeder of the at least two wire feeders is attached to the welding torch via the respective connector and remaining wire feeders of the least two wire feeders are attached to the at least one mount.

These and other aspects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Embodiments of the invention relate to systems and methods for managing wire feeders of a welding system. In particular, unused wire feeders can be stowed while preserving ready access and swapping. The welding system may include two or more wire feeders individually and singly attached to a welding torch. The welding system includes one or more mount points for attachment by unused wire feeders. The mount points secure unused wire feeders and enable convenient swapping of an active wire feeder (e.g. the wire feeder attached to the torch).

A "welding system" as utilized herein refers to an apparatus or a collection of apparatuses having an implement adapted to perform a welding operation. A welding operation may include, but is not limited to, welding, brazing, soldering, coating, hardfacing, and/or cutting. The implement may include a laser, a waterjet, flame or arc generating torch, and/or any other system used in preforming the welding operation. "Welding" or "weld" (including other formatives of these terms), and in particular arc welding, refers to deposition of molten material through operation of an electric arc. Suitable welding processes include, but are not limited to, submerged arc, MIG, MAG, TIG, stick welding, FCAW, etc.

Various embodiments will now be described with reference to the drawings, wherein like reference numerals are used to refer to like elements throughout. In the following description, for purposes of explanation, numerous specific details are set forth in order to provide a thorough understanding of the embodiments. It may be evident, however, that features described herein can be practiced without these specific details. Additionally, other embodiments are possible and the features described herein are capable of being practiced and carried out in ways other than as described. The terminology and phraseology used herein is employed for the purpose of promoting an understanding of the invention and should not be taken as limiting.

An exemplary orbital welding system will be described with reference to the drawings. Other welding systems, including other mobile welding system configurations, may be utilized with aspects described herein and the examples shown in the figures are not limiting. For example, a mobile welding system having a chassis with a wheel system for travelling along and/or adjacent to a workpiece may be utilized. A welding unit or tractor may be mounted on the chassis.

Figure 1:
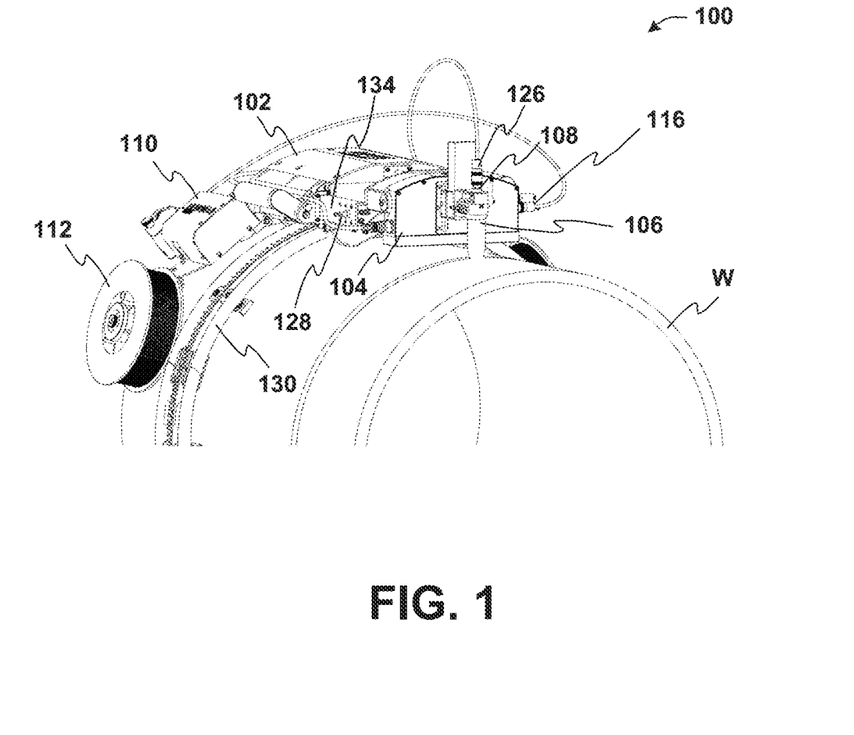
FIG. 1 illustrates an exemplary, non-limiting embodiment of a welding system that includes mounts to stow unused wire feeder components according to one or more aspects.
Figure 2:
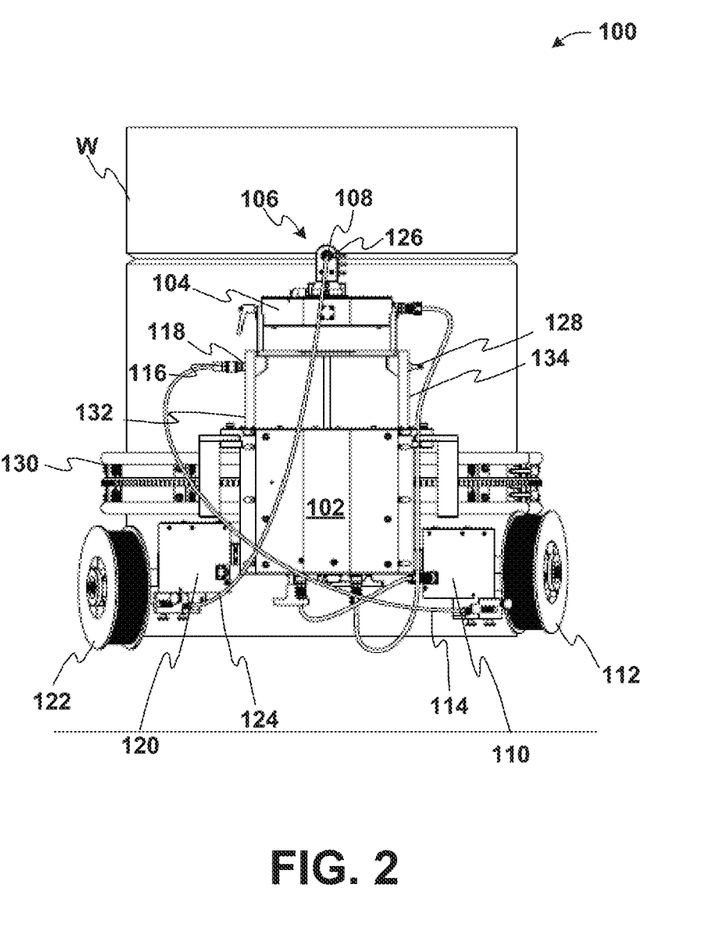
FIG. 2 illustrates a top view of the exemplary, non-limiting embodiment of the welding system of FIG. 1.
Figure 3:
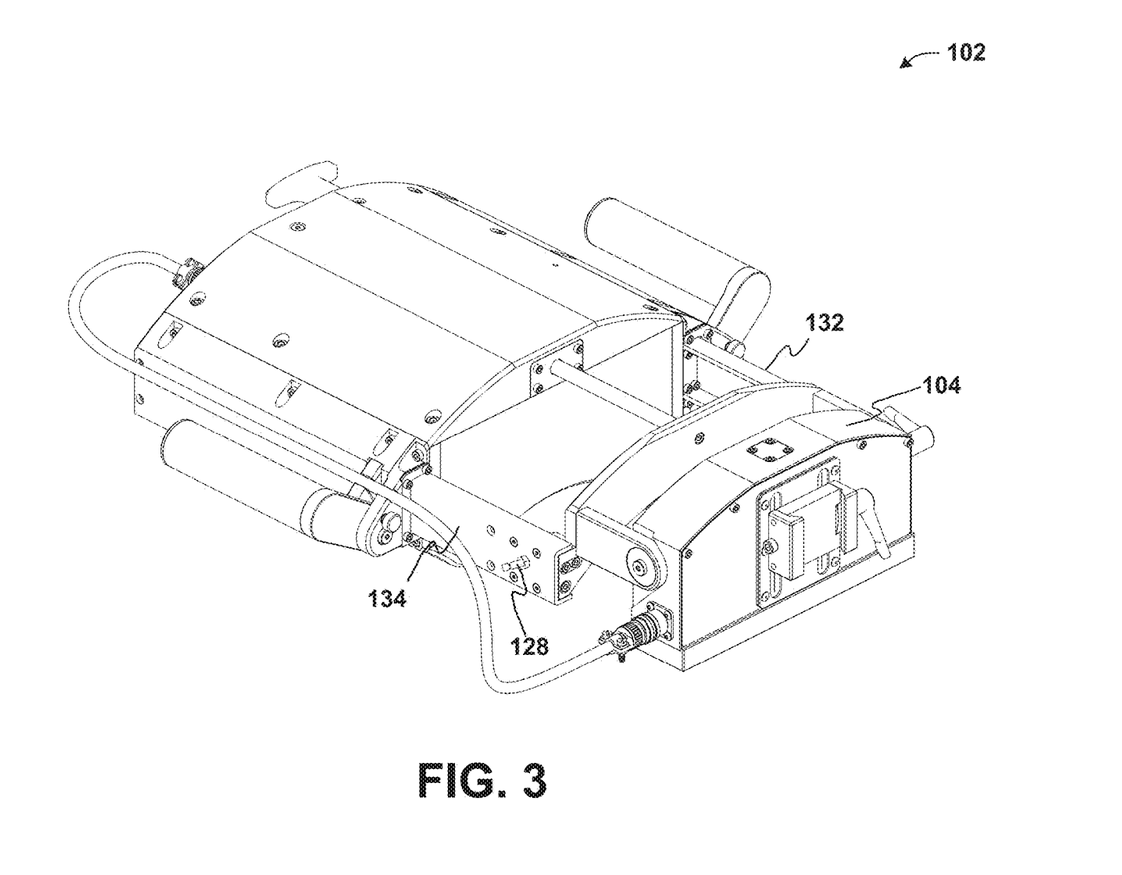
FIG. 3 illustrates a front perspective view of the exemplary, non-limiting embodiment of a welder unit.
Figure 4:
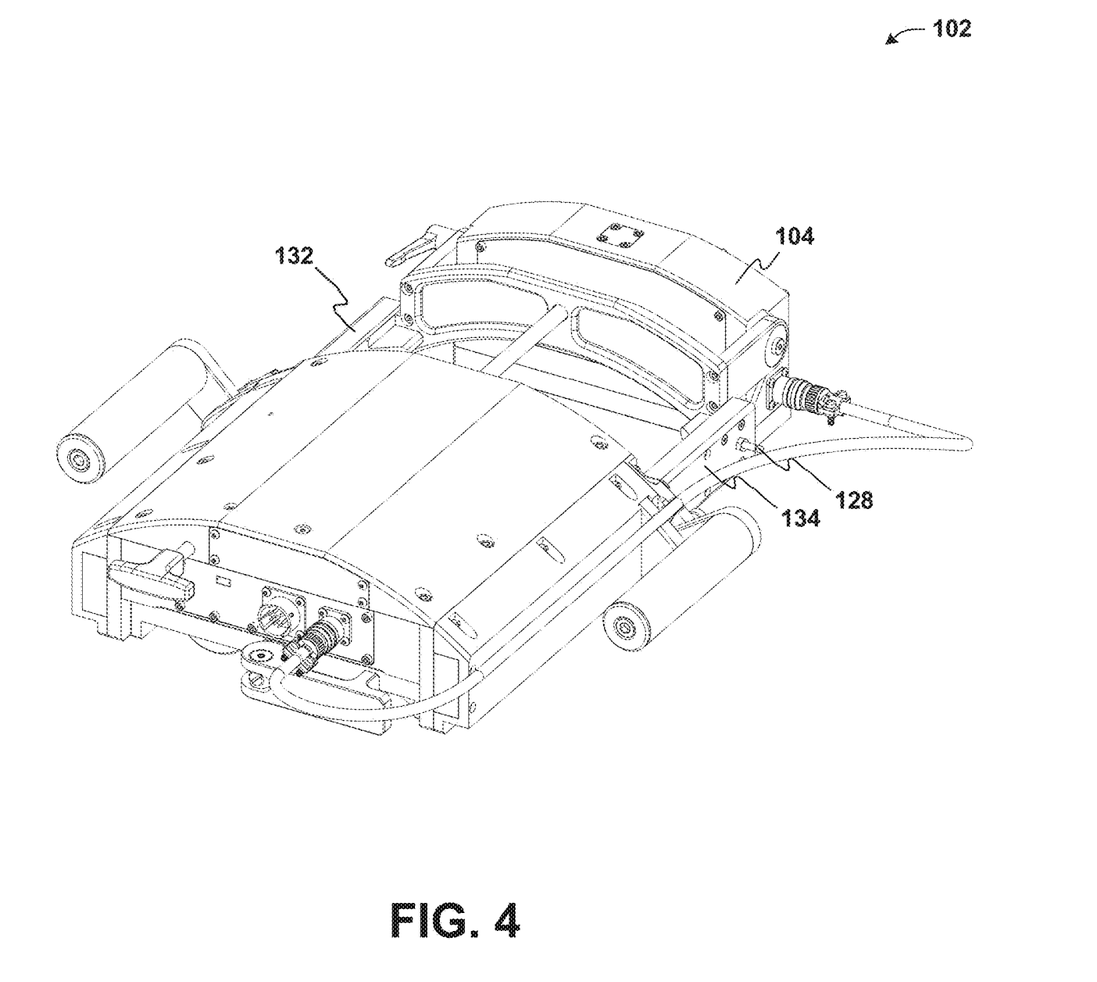
FIG. 4 illustrates a rear perspective view of the exemplary, non-limiting embodiment of the welder unit of FIG. 3.
Figure 5:
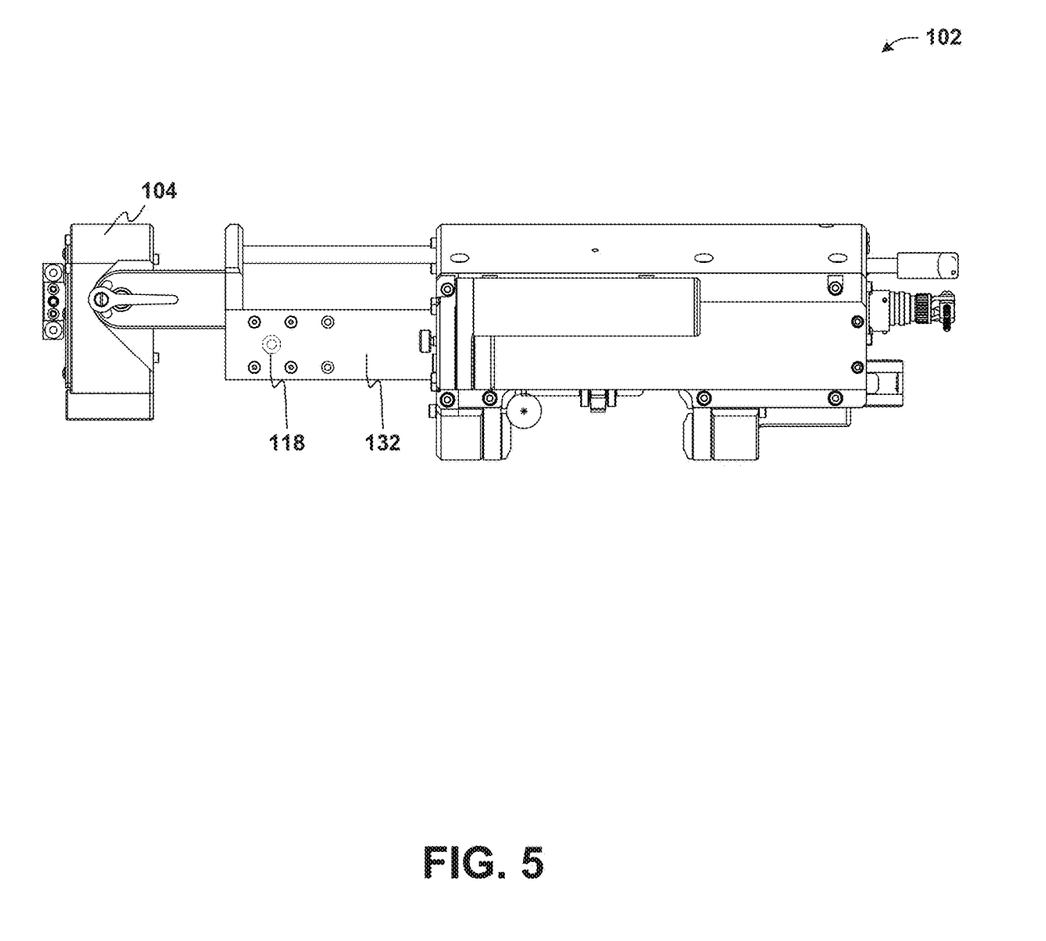
FIG. 5 illustrates a side view of the exemplary, non-limiting embodiment of the welder unit of FIG. 3.
Figure 6:
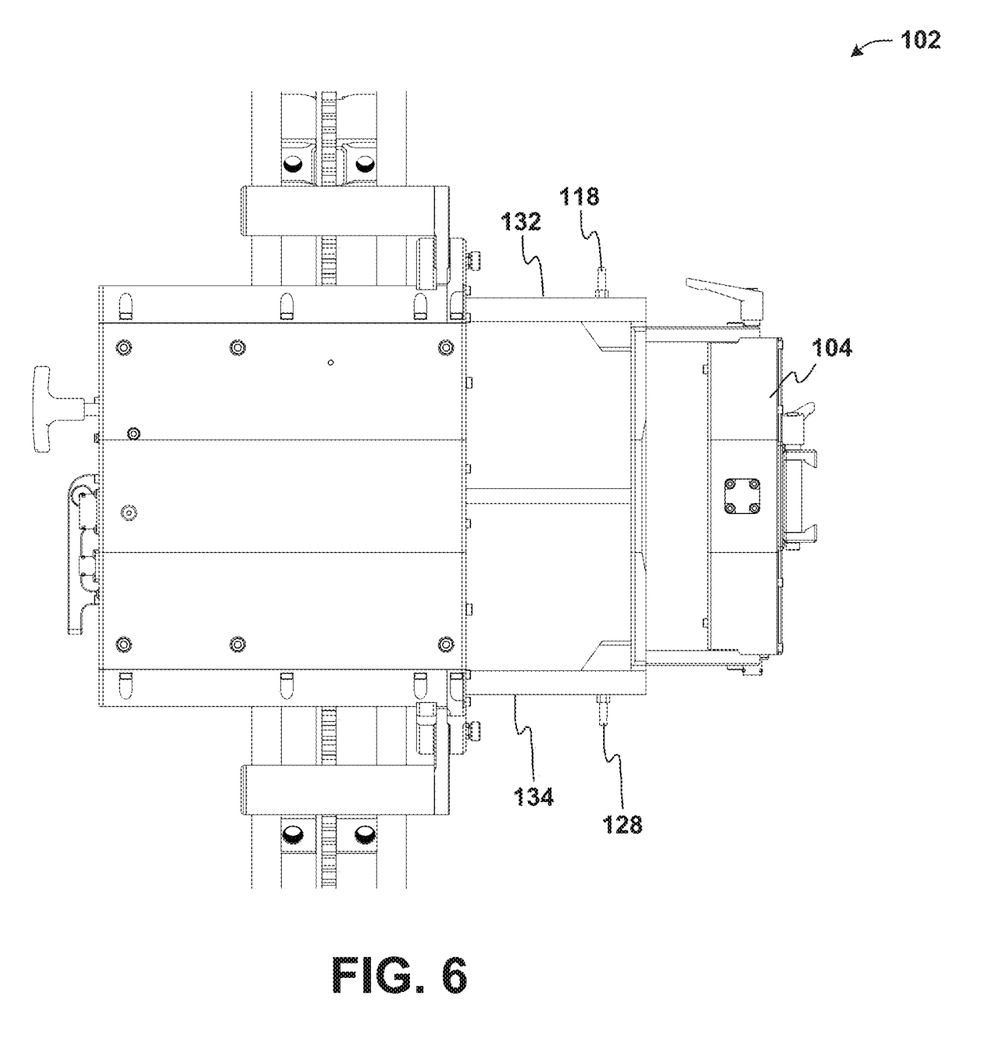
FIG. 6 illustrates a top view of the exemplary, non-limiting embodiment of the welder unit of FIG. 3.

FIGS. 1 and 2 illustrate a welding system 100 configured to secure unused wire feeder components during a welding operation. Welding system 100 may be a gas metal arc welding (GMAW) system, including either a MIG or MAG system, adapted to generate an arc between a consumable wire electrode and a workpiece W, such as a section of a pipe to be joined to another section of pipe as shown in the figures.

Welding system 100 may also be an orbital welding system having a welder or tractor unit 102 mounted on a guide track 130 associated with the workpiece W. The welder unit 102 can include a weld head unit 104 that supports an implement such as a welding torch 106. As shown in the figures, welding system 100 includes a first wire feeder 110 and a second wire feeder 120 adapted to supply welding wire from respective first and second spools 112, 122 to the torch 108. Each wire feeder 110, 120 may be adapted to feed welding wire through respective wire liners 114 and 124. Wire liners 114 and 124 may terminate with various connectors to facilitate attachment to various receptacles. Wire liners 114 and 124 may have respective connectors 116 and 126 that may attach to the various receptacles. For example, connector 126 associated with wire liner 124 may terminate with receptacle 108, which may be a quick disconnect associated with torch 106.

As shown in the figures, welding system 100 includes two wire feeders 110 and 120 associated with wire spools 112 and 122. By way of example, wire feeders 110 and 120 may include an electric motor that automatically feeds wire from respective spools 112 and 122 to the welding torch 106. The welding liners 114 and 124 may guide the wire from the wire feeders 110 and 120 to the receptacle 108 of torch 106. The welding liners 114 and 124 may also act as a protective shield to insulate the wire from dirt and debris. In an exemplary welding operation, only one wire feeder may utilized as a supply for the wire electrode at any given time. In other exemplary welding operations, the system 100 may be configured with more than one torch 106, which may utilize more than one wire feeder.

In FIGS. 1 and 2, the wire feeder 120, associated with wire spool 122, is attached to the torch 106 by attaching connector 126 to receptacle 108. In this configuration, the wire liner 114 associated with wire feeder 110 and wire spool 112 may be unused. Wire liner 114 may be untethered and free to move about the welding unit 102 and may introduce possible hazards. In addition to possible hazards, the untethered welding liner 114 may allow dirt and debris to enter the open end of the welding liner causing unwanted damage or corrosion to the wire. The welding system 100 provides a stowage position for wire feeders such that unused wire liners (e.g., wire liner 114) do not remain untethered during welding operations. As shown in FIGS. 1 and 2, the connector 116 of unused wire liner 114 is attached to mount 118 to prevent movement of the wire liner 114. Wire feeder 110 and the wire on spool 112 are not electrically charged or hot when unconnected from the welding torch 106.

In FIGS. 1 and 2, one or more mounts or receptacles 118, 128 may be provided on the welder unit 102, the weld head 104, or another portion of welding system 100. For example, mount 128 is shown in FIGS. 1 and 2 without a wire feeder attached. A similar mount 118 is shown in the figures with connector 116 attached thereto. According to an aspect, mounts 118 and 128 may have a similar form as the receptacle 108 provided on torch 106. As such, the wire feeders 110 and 120 can be readily swapped between mount 118, mount 128 and receptacle 108 using the same wire liner connector (e.g., connectors 116, 126).

The welder unit 102 is shown individually in FIGS. 3-6. As shown in the figures, mounts 118 and 128 may be attached to the welder unit 102 to provide stowage for unused wire feeders. In an exemplary embodiment, the mounts 118 and 128 may be attached to surfaces 132 and 134, respectively. A hole may be drilled in surfaces 132 and 134 to receive mounts 118 and 128. Mounts 118 and 128 may be secured to surfaces 132 and 134 by attaching a nut to a threaded portion of mount 118 or 128. Similarly, any other manner of attaching a mount or receptacle to the welder unit 102 may be utilized (e.g., adhesive, welding, pressure fitting, etc.).

FIGS. 1-6 depict welding system 100 having two mounts for unused welding feeders. In this example, the number of mounts equals the number of wire feeders configured for the system. In another example, the number of mounts may be less than the number of wire feeders. For instance, the number of mounts may be one less than the number of wire feeders. In this example, there will be at least one wire feeder connected to torch 106 at all times. The wire of the other, unused wire feeder will not be electrically charged while unconnected.

To illustrate further, in one exemplary weld operation, a solidcore wire can be loaded on wire feeder 110 and a fluxcore wire may be loaded on wire feeder 120. The welding system 100 utilizes wire feeder 110 to perform an STT root pass and then switches to utilize wire feeder 120 to fill in the rest of the joint.

Figure 7:
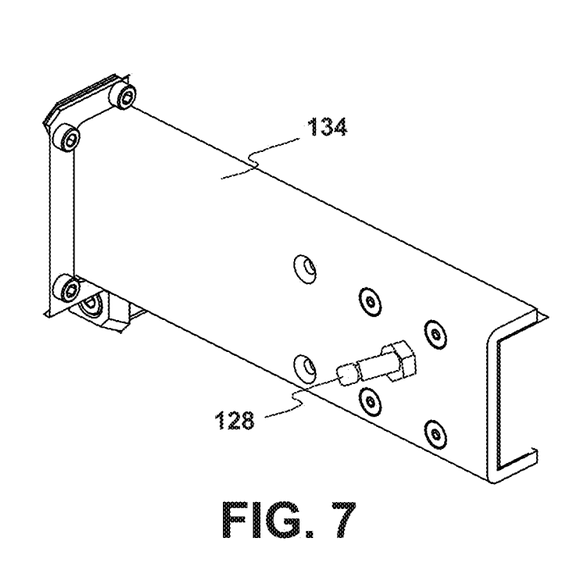
FIG. 7 illustrates a perspective view of the exemplary, non-limiting embodiment of a component of the welding unit of FIG. 3.
Figure 8:
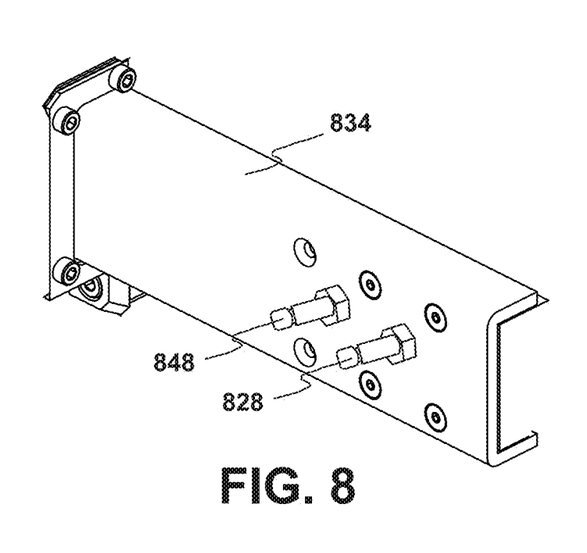
FIG. 8 illustrates a perspective view of the exemplary, non-limiting embodiment of a component of the welding unit of FIG. 3 with multiple connectors.

FIG. 7 shows a closer view of the surface 134 of the welding unit 102 with mount 128 attached. In another embodiment shown in FIG. 8, two mounts 828, 848 are attached to the surface 834. A welding unit 102 may utilize two mounts 828, 848, as shown in FIG. 8, for each side of the welding unit for a total of 4 mounts. It should be appreciated that any number of wire feeder mounts may be utilized to better suit the need of the specific welding equipment. In addition, the wire feeder mounts may be affixed to any suitable surface of the welding unit 102.

Figure 9:
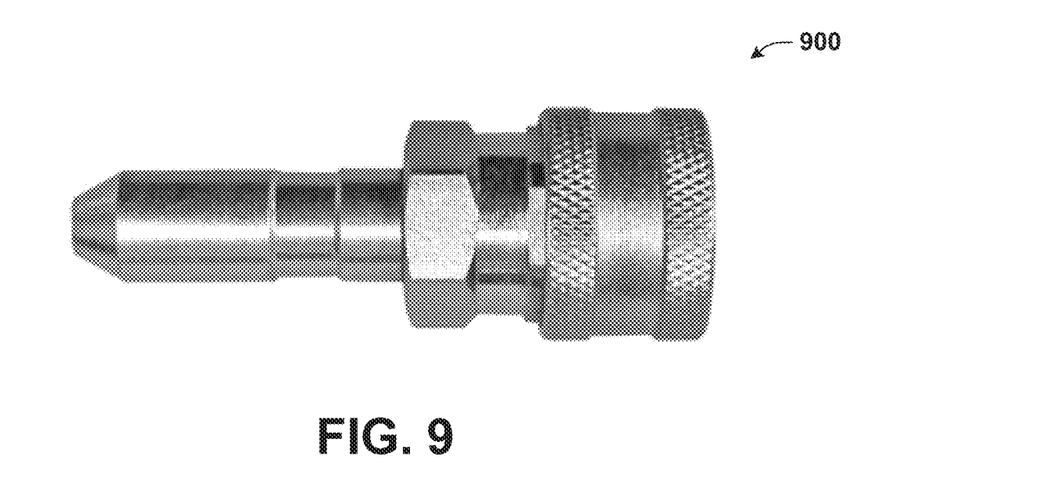
FIG. 9 illustrates an exemplary connector that may be used in an embodiment of the invention.
Figure 10:
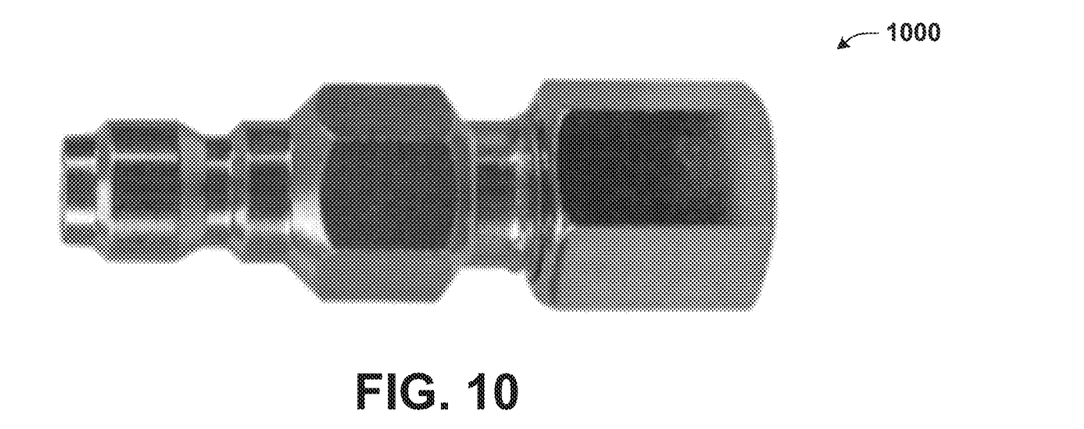
FIG. 10 illustrates an exemplary connector that may be used in an embodiment of the invention.
Figure 11:
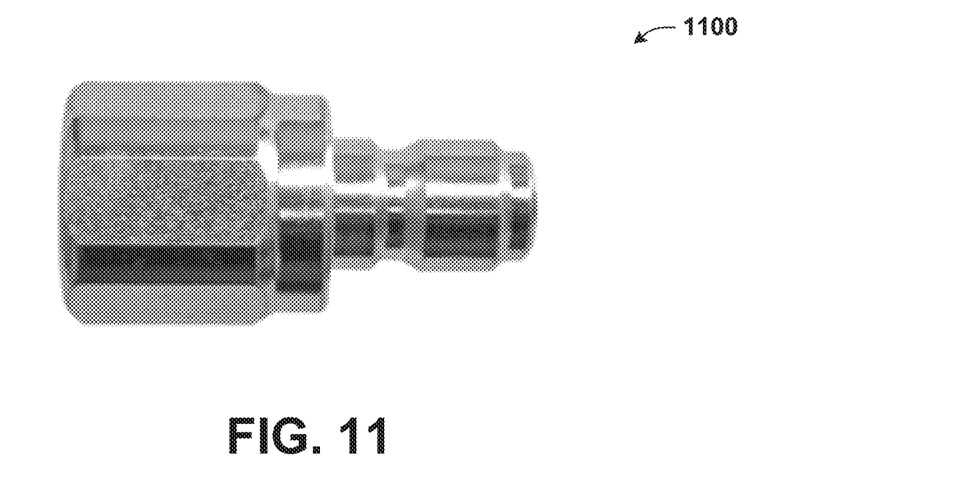
FIG. 11 illustrates an exemplary connector that may be used in an embodiment of the invention.

FIGS. 9-11 illustrate exemplary connectors and receptacles that may be used in an embodiment of the present invention. In an exemplary embodiment, a male connector may be affixed to a wire liner and a female mounting receptacle may be affixed to a surface of the welding unit. A similar female receptacle may be associated with a weld torch to facilitate a connection with the male connector of the wire liner.

In another exemplary embodiment, a female connector may be affixed to a wire liner and a male mounting receptacle may be affixed to a surface of the welding unit. A similar male receptacle may be associated with a weld torch to facilitate a connection with the female connector of the wire liner. One skilled in the art should appreciate that any type of connector or receptacle may be utilized in the system 100 to create a stowage location for an unused wire liner. The connection device used to create a stowage location of an unused wire liner may be identical or similar to a connection device provided on a weld torch. Utilizing similar connection devices may allow a user to quickly change wire feeders during a welding operation without having to modify the connection devices of various aspects of the system (e.g., the wire liner, torch receptacle, etc.).

In another exemplary embodiment, the connectors used in the system 100 may be quick disconnect devices. Quick disconnects allow for fast and easy coupling and de-coupling of welding devices. For example, wire feeder 110 may be easily removed from the torch 104, and wire feeder 120 may be easily attached to torch 104. Quick disconnects may utilize a male connector and a respective female connector. A user may couple or de-couple the respective connectors by pulling back on a collar of the female quick disconnect connector. While the collar of the female connector is pulled back, the user may either insert or remove the male connector from the female connector. The quick disconnect connectors (either male or female) may be attached to the wire liner in a similar manner as previously described. A corresponding quick disconnect connector may be installed on the torch 104 to facilitate a connection to a wire feeder. Further a connector may be placed on any other location of the welding system 100 to function as a mount for an unused wired feeder.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A welding system, comprising:
a welder unit coupled to at least one of a guide track or a mobile chassis;
a weld head unit operatively coupled to the welder unit, the weld head unit supporting a welding torch;
a first wire feeder mounted on the welder unit and having a first wire liner terminated with a first connector;
a second wire feeder mounted on the welder unit and having a second wire liner terminated with a second connector;
a first mount configured to receive the first connector terminating the first wire liner of the first wire feeder; and
a second mount configured to receive the second connector terminating the second wire liner of the second wire feeder,
wherein the first mount is positioned on the welding torch and the second mount is unattached from the welding torch.

2. The welding system of claim 1, wherein the first and second mounts have a same functional shape.

3. The welding system of claim 1, wherein the first and second connectors are quick disconnects.

4. The welding system of claim 1, wherein wire associated with the second wire feeder is not electrically charged and wherein wire associated with the first wire feeder is electrically charged while the first connector is connected to the welding torch.

5. The welding system of claim 1, wherein the second mount is attached to the welder unit.

6. The welding system of claim 1, wherein a number of mounts in the welding system unattached from the welding torch is one less than a number of wire feeders in the welding system.

7. The welding system of claim 1, wherein a number of mounts in the welding system unattached from the welding torch is the same as a number of wire feeders in the welding system.

8. The welding system of claim 1, wherein the welder unit is an orbital welder.

9. The welding system of claim 1, wherein each of the first and second wire feeders include a respective first and second wire spools for storing wire, wherein the first wire feeder feeds wire from the first wire spool through the first wire liner to the welding torch.

10. The welding system of claim 1, wherein the welding system includes a second welding torch and at least three feeders mounted on the welder unit, wherein the at least three feeders include the first wire feeder, the second wire feeder, and a third wire feeder having third wire liner terminated with a third connector.

11. The welding system of claim 1, wherein the first and second connectors are female connectors, and the first and second mounts provide male connection points for the first and second connectors.

12. The welding system of claim 1, wherein the first and second connectors are male connectors, and the first and second mounts provide female connection points for the first and second connectors.

13. A method for a welding system, the welding system including a welder unit coupled to at least one of a guide track or a mobile chassis, a weld head unit operatively coupled to the welder unit, the weld head unit supporting a welding torch, and first and second wire feeders mounted on the welder unit, wherein the first and second wire feeders include respective first and second wire liners terminated with respective first and second connectors, comprising:
    attaching the first wire feeder to a first mount associated with the welding torch via the first connector; and
    attaching the second wire feeder a second mount via the second connector, wherein the second mount is unattached from the welding torch.

14. The method according to claim 13, wherein the first and second mounts have a same functional shape.

15. The method according to claim 13, wherein the first and second connectors are quick disconnects.

16. The method according to claim 13, wherein wire associated the second wire feeder is not electrically charged and wherein wire associated with the first wire feeder is electrically charged while the first connector is connected to the welding torch and power is supplied to the welding torch.

17. The method according to claim 13, wherein the second mount is attached to the welder unit.

18. The method according to claim 13, wherein a number of mounts in the welding system unattached from the welding torch is one less than a number of wire feeders in the welding system.

19. The method according to claim 13, wherein a number of mounts in the welding system unattached from the welding system is the same as a number of wire feeders in the welding system.

20. The method according to claim 13, wherein the welder unit is an orbital welder.

* * * * *